United States Patent Office 3,047,576
Patented July 31, 1962

3,047,576
1,1'-(HEXAFLUOROGLUTARYL)-BIS(4-PHENYLPIPERAZINE)
Joe Haller Clark, Woodcliff Lake, N.J., and Leon Goldman, Nanuet, Lee Norman Starker, Pearl River, and Janet K. Paul, Spring Valley, N.Y., assignors to American Cyanamid Company, New York, N.Y., a corporation of Maine
No Drawing. Filed Oct. 20, 1959, Ser. No. 847,461
1 Claim. (Cl. 260—268)

This invention relates to an improved process of preparing halogenated alkanoylpiperazines. More particularly, it relates to the process of reacting lower alkyl esters of halogenated alkanoic acids with substituted piperazines.

The group of compounds broadly classifiable as halogenated alkanoylpiperazines have been found useful in several different fields. The mono and dihaloacetylpiperazines such as described and claimed in U.S. Patent 2,807,617 are useful in treating hookworm infections while at the same time being relatively non-toxic to the host. The trihaloacetyl piperazines which are described and claimed in U.S. Patent 2,909,524 are highly active in the treatment of haemonchosis in animals. Improved methods of preparing these compounds are therefore highly desirable.

Conventionally, piperazines have been acylated with halo and polyhaloalkanoyl halides and anhydrides. These latter reagents, however, are corrosive, irritating, unstable, and generally difficult to work with. The esters of the halo and polyhaloalkanoic acids of this invention, however, are cheaper, less corrosive, less irritating, and more stable. The improved process of this reaction not only avoids the difficulties suggested above, but is more convenient and affords higher yields of the product amides. Furthermore, use of the esters by the method of this invention obviates the need for a solvent, although one can be used, and does not require use of an acid binder to take up the acid that is generated when acid anhydrides and acid chlorides are employed. Finally, the stoichiometry of the present method is more favorable.

The process of the present invention can be illustrated by the following equation.

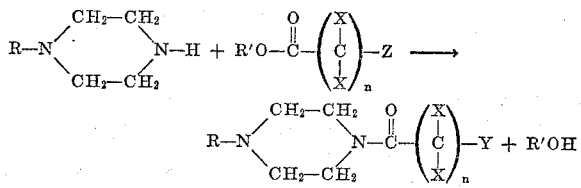

in which R is a phenyl, lower alkylphenyl, halophenyl, carboloweralkoxy or heterocyclic radical, R' is a lower alkyl radical, X is a halogen radical, Z is hydrogen, halogen or a carboloweralkoxy radical, $n$ is a whole integer from 1 to 8 and Y is hydrogen or a halogen or a $$-\underset{\underset{O}{\|}}{C}-N\underset{(CH_2)_2}{\overset{(CH_2)_2}{\diagup}}N-R$$

radical.

The substituted piperazines used as starting material can be for example 1-phenylpiperazine, 1-(2,6-xylyl)piperazine, 1-(m-chlorophenyl)piperazine, 1-(p-chlorophenyl)piperazine, 1-carbethoxypiperazine, 1-carbisobutoxypiperazine, 1-(p-bromophenyl)piperazine, 1-(m-bromophenyl)piperazine, 1-(2-pyrimidinyl)piperazine, 1-(2-pyridyl)piperazine, 1-(2-thiazolyl)piperazine, 1-(3-pyridazinyl)piperazine, and the like.

The lower alkyl esters of halogenatel alkanoic acids can be for example, ethyl chlorodifluoroacetate, ethyl fluorodichloroacetate, ethyl trifluoroacetate, ethyl difluoroacetate, ethyl dichloroacetate, methyl dichloroacetate, ethyl heptafluorobutyrate, ethyl pentadecafluorooctanoate, ethyl hexafluoroglutarate, ethyl hexachloroglutarate and the like.

Usually the reaction of the present invention is carried out without the use of a solvent. The two reactants are preferably mixed together in stoichiometric amounts or, in the case of more vigorous reactants, one is added slowly to the other. During mixing or addition, cooling may be required, and on the other hand after mixing or addition, warming may be desirable to complete the reaction. After the reaction is complete evaporation of the alcohol produced gives the product as a residue. The product can also be recovered from the reaction mixture by filtration following the adding of a diluent. Generally, the reaction is carried out within a temperature range of 20–110° C. The reaction is usually complete within a period of 10 minutes to several hours depending upon the temperature used.

The compounds prepared by the process of the present invention are useful in treating parasites or helminths in animals. These parasites are for example, Haemonchus in cattle or sheep, Ostertagia in cattle or sheep, Oesophagostomum in sheep or cattle, Bunostomum in sheep, Nematodirus in sheep, Dictyocaulus in cattle, Metastrongylus in swine.

The following examples illustrate in detail the preparation of representative halogenated alkanoylpiperazines.

EXAMPLE I

*Preparation of 1-Phenyl-4-Cholorodifluoroacetyl-piperazine*

To 34.9 g. of ethyl chlorodifluoroacetate is added dropwise, with stirring, 32.4 g. of 1-phenylpiperazine during a one-half hour period at 20–25° C. The resulting solution is heated at 55–60° C. for one hour and then concentrated under reduced pressure to yield 55.2 g. of 1-phenyl-4-chlorodifluoroacetylpiperazine as a pale brown solid, melting point 38–42.5° C. One recrystallization from aqueous ethanol gives 46.0 g. of colorless crystals, melting point 50.5–51.5° C.

EXAMPLE II

*Preparation of 1-Phenyl-4-Trifluoroacetylpiperazine*

To 31.3 g. of ethyl trifluoroacetate is added dropwise, with stirring, 32.4 g. of 1-phenylpiperazine during a 20 minute period at 20–25° C. The solution is heated for 1½ hours at 55° C. and is then concentrated under reduced pressure. The residue is slurried with petroleum ether (B.P. 90–100° C.) and the resulting solid removed by filtration to yield 50.2 g. of 1-phenyl-4-trifluoroacetylpiperazine as colorless crystals. One recrystallization from aqueous ethanol raises the melting point to 66–67° C.

EXAMPLE III

*Preparation of 1-Phenyl-4-Difluoroacetylpiperazine*

To 27.3 g. of ethyl difluoroacetate is added dropwise, with a stirring, 32.4 g. of 1-phenylpiperazine during a 45 minute period at 20–25° C. A white precipitate begins to separate as soon as the amine addition has begun and 50 ml. of absolute ethanol is added to the mixture to give a clear solution. The solution is heated at 55–60° C. for one hour and then concentrated under reduced pressure to yield 48.1 g. of a purple solid, melting point 45–60° C. Recrystallization of this solid from aqueous ethanol gives 33.4 g. of pale purple crystals of 1-phenyl-4-difluoroacetylpiperazine. Treatment with activated charcoal in aqueous ethanol yields 27.8 g. of colorless crystals, melting point 56–57° C.

EXAMPLE IV

*Preparation of 1-(2,6-Xylyl)-4-Trifluoroacetylpiperazine*

To 1.92 g. of 1-(2,6-xylyl)piperazine is added 1.56 g. of ethyl trifluoroacetate and the resulting solution is heated for one hour at 55–60° C. Concentration of the reaction solution under reduced pressure yields 2.86 g. of 1-(2,6-xylyl)-4-trifluoroacetylpiperazine as a pale brown solid. One recrystallization from absolute ethanol yields colorless crystals, melting point 72.5–74.5° C.

EXAMPLE V

*Preparation of 1-(m-Chlorophenyl)-4-Trifluoroacetylpiperazine*

To 1.99 g. of 1-(m-chlorophenyl)piperazine is added 1.56 g. of ethyl trifluoroacetate and the resulting solution is treated in the same manner as Example IV to yield 2.96 g. of 1-(m-chlorophenyl)-4-trifluoroacetylpiperazine as pale brown crystals. One recrystallization from absolute ethanol gives colorless crystals, melting point 51.5–53.0° C.

EXAMPLE VI

*Preparation of 1-(p-Chlorophenyl)-4-Trifluoroacetylpiperazine*

To 1.96 g. of 1-(p-chlorophenyl)piperazine is added 1.56 g. of ethyl trifluoroacetate and the resulting solution is treated in the same manner as Example IV to yield 2.93 g. of 1-(p-chlorophenyl)-4-trifluoroacetylpiperazine as colorless crystals. One recrystallization from absolute ethanol raises the melting point to 100–101° C.

EXAMPLE VII

*Preparation of 1-(2-Pyrimidinyl)-4-Trifluoroacetylpiperazine*

To 1.64 g. of 1-(2-pyrimidinyl)piperazine is added 1.56 g. of ethyl trifluoroacetate and the resulting solution is treated in the same manner as Example IV to yield 2.59 g. of 1-(2-pyrimidinyl)-4-trifluoroacetylpiperazine as pale brown crystals. One recrystallization from absolute ethanol gives colorless crystals, melting point 77.5–78.5° C.

EXAMPLE VIII

*Preparation of 1-(2-Pyridyl)-4-Trifluoroacetylpiperazine*

To 1.63 g. of 1-(2-pyridyl)piperazine is added 1.56 g. of ethyl trifluoroacetate and the resulting solution is treated in the same manner as Example IV to yield 2.62 g. of 1-(2-pyridyl)-4-trifluoroacetylpiperazine as pale brown crystals. Two recrystallizations from 50% ethanol gives colorless crystals, melting point 53–54° C.

EXAMPLE IX

*Preparation of 1-Carbethoxy-4-Trifluoroacetylpiperazine*

To 1.62 g. of 1-carbethoxypiperazine is added 1.56 g. of ethyl trifluoroacetate and the resulting solution is treated in the same manner as Example IV to yield 2.57 g. of a pale yellow oil. The oil is dissolved in ether, washed with 10% sodium bicarbonate solution, water, 2 N hydrochloric acid, and finally with water until the wash is neutral. The ethereal layer is then dried over sodium sulfate and concentrated to give 2.11 g. of 1-carbethoxy-4-trifluoroacetylpiperazine as a colorless oil.

EXAMPLE X

*Preparation of 1-Carbisobutoxy-4-Trifluoroacetylpiperazine*

To 1.87 g. of 1-carbisobutoxypiperazine is added 1.56 g. of ethyl trifluoroacetate and the resulting solution is treated in the same manner as Example IV to yield 2.80 g. of 1-carbisobutoxy-4-trifluoroacetylpiperazine as pale yellow crystals, melting point 38–40° C.

EXAMPLE XI

*Preparation of 1-Phenyl-4-Heptafluorobutyrylpiperazine Hydrochloride*

A solution of 53.3 g. of ethyl heptafluorobutyrate in 25 ml. of ethanol is treated with 32.4 g. of 1-phenylpiperazine at 20–25° C. and then heated on a steam bath for three hours. After concentration under reduced pressure, the residue is triturated with petroleum ether (B.P. 30–60° C.) and filtered to give 9.50 g. of colorless crystals of 1-phenylpiperazine heptafluorobutyrate, melting point 115.8–118.5° C. The filtrate is concentrated to dryness and the residue dissolved in ether. The ethereal solution is washed with sodium bicarbonate solution and water, after which it is treated with activated charcoal and dried over sodium sulfate. The addition of anhydrous hydrogen chloride then yields 51.7 g. of colorless crystals of 1-phenyl-4-heptafluorobutyrylpiperazine hydrochloride, melting point 174–180° C. Recrystallization from ethanol raises the melting point to 180–180.5° C.

EXAMPLE XII

*Preparation of 1-Phenyl-4-Pentadecafluorooctanoylpiperazine*

To 48.7 g. of ethyl pentadecafluorooctanoate in 50 ml. of ethanol is added 16.2 g. of 1-phenylpiperazine during a 40 min. period at 20–25° C. The reaction solution is heated at 60–70° C. for one hour and then concentrated under reduced pressure to a brown solid, melting point 61–65° C. Recrystallization from aqueous ethanol yields 27.5 g. of pale brown crystals. Repeated recrystallizations from ethanol yield 14.2 g. of 1-phenyl-4-pentadecafluorooctanoylpiperazine as colorless crystals, melting point 78–79° C.

EXAMPLE XIII

*Preparation of 1,1'-(Hexafluoroglutaryl)bis(4-Phenylpiperazine)*

A solution of 3.24 g. of 1-phenylpiperazine in 2.96 g. of ethyl hexafluoroglutarate is heated at 60–70° C. for one hour and is then concentrated under reduced pressure to a dark brown glass. Trituration of the residue with petroleum ether (B.P. 90–100° C.) and subsequent filtration yields 4.50 g. of pale brown crystals of 1,1'-(hexafluoroglutaryl)bis(4-phenylpiperazine). Recrystallization from ethanol raises the melting point to 116.5–117.5° C.

EXAMPLE XIV

*Preparation of 1-Dichloroacetyl-4-Phenylpiperazine*

1-phenylpiperazine (12.15 kg.) and 10.68 kg. of methyl dichloroacetate are mixed and the temperature is allowed to rise to 65° C. before cooling is applied. Partial solidification occurs and 20 liters of alcohol is added to form a slurry. After standing overnight, the solid is removed by filtration, washed with three portions of alcohol and dried. The crude product is recrystallized from 95 liters of alcohol to yield 10.9 kg. of 1-phenyl-4-dichloroacetylpiperazine as colorless crystals, melting point 130–133° C.

EXAMPLE XV

*Preparation of 1-Dichloroacetyl-4-Phenylpiperazine*

To 40.5 g. of 1-phenylpiperazine in 50 ml. of ethylene glycol is gradually added 53 g. of methyl dichloroacetate at 30–31° C. The mixture is stirred for two hours at 33–41° C. until the reaction is completed. The mixture is then treated with 150 ml. of cold water and after cooling to 12° C. the product is removed by filtration and washed with cold water to yield, after drying, 56.5 g. of a colorless, crystalline solid, melting point 120-126° C. Slurrying of the product with methanol followed by filtration and drying yields 49.2 g. of 1-dichloroacetyl-4-phenylpiperazine as colorless crystals, melting point 130–132° C.

EXAMPLE XVI

*Preparation of 1-Dichloroacetyl-4-Phenyl-Piperazine*

To 81 g. of 1-phenylpiperazine in 75 ml. of methyl Cellosolve is slowly added 71.5 g. of methyl dichloroacetate at 33–36° C. The temperature is then allowed to rise to 39–42° C. until completion of the reaction (approximately three hours), after which the mixture is poured into 250 ml. of water. The solid which separates is removed by filtration, washed with water and then with methanol, and dried to yield 73 g. of 1-dichloroacetyl-4-phenylpiperazine as an almost colorless solid, melting point 129–130.5° C.

We claim:

The compound 1,1'-(hexafluoroglutaryl)-bis(4-phenylpiperazine).

References Cited in the file of this patent
UNITED STATES PATENTS

| | | |
|---|---|---|
| 2,483,885 | Crooks et al. | Oct. 4, 1949 |
| 2,807,617 | Dalalian et al. | Sept. 24, 1957 |
| 2,909,524 | Dalalian et al. | Oct. 20, 1959 |

OTHER REFERENCES

Clermont: Compt. rend. (Fr. Acad. Sci.), vol. 133, page 737 (1954).

Joullie et al.: Jour. Am. Chem. Soc., vol. 76, pages 2990–2993 (1954).